(12) United States Patent
Rácz et al.

(10) Patent No.: US 7,334,659 B2
(45) Date of Patent: Feb. 26, 2008

(54) DRIVE UNIT SUSPENSION STRUCTURE, MAINLY FOR REAR ENGINE BUS

(76) Inventors: András Rácz, Fillér utca 26, Budapest 1026 (HU); József Petrovics, Kisfaludi utca 26, Budapest 1191 (HU); László Rosás, Fö-utca 37/A, Budapest 1011 (HU)

( * ) Notice: Subject to any disclaimer, the term of this patent is extended or adjusted under 35 U.S.C. 154(b) by 435 days.

(21) Appl. No.: 10/519,178

(22) PCT Filed: Jun. 19, 2003

(86) PCT No.: PCT/HU03/00047

§ 371 (c)(1),
(2), (4) Date: Dec. 20, 2004

(87) PCT Pub. No.: WO04/000594

PCT Pub. Date: Dec. 31, 2003

(65) Prior Publication Data

US 2005/0211497 A1  Sep. 29, 2005

(30) Foreign Application Priority Data

Jun. 21, 2002  (HU) .................................. P0202045

(51) Int. Cl.
*B60K 17/00* (2006.01)
(52) U.S. Cl. ...................................... 180/352; 180/377
(58) Field of Classification Search ................ 180/352, 180/354, 355, 359, 360, 374, 375, 376, 377, 180/378, 291, 295, 312
See application file for complete search history.

(56) References Cited

U.S. PATENT DOCUMENTS 1,976,701 A * 10/1934 Trott ........................... 180/300

2,076,046 A * 4/1937 Schjolin ....................... 180/55

(Continued)

FOREIGN PATENT DOCUMENTS

HU  212 315 B  5/1996

(Continued)

*Primary Examiner*—Paul N. Dickson
*Assistant Examiner*—Tiffany L. Webb
(74) *Attorney, Agent, or Firm*—Norman N. Kuntz; Fitch, Even, Tabin and Flannery

(57) ABSTRACT

The invention relates to a transmission suspension structure for a rear engine vehicle, mainly bus, where the drive engine (3) and the gearbox (4) are built uniaxially to form a rigid transmission unit (2), which has suspension brackets (8, 9) in front and behind the center of gravity of the unit (2), in respect of the geometric axis of rotation of its main axis, the suspension bracket(s) (9) behind the center of gravity is (are) adjoined to the gearbox (4), a further two suspension brackets (8) are adjoined to the lower ends (23) of the two suspension bars (20) holding the transmission, and at the upper ends of the said suspension bars there are flexible adjoining members (21) for linkage to the body of the bus in the vicinity of its right hand side and left hand side walls. According to the invention on each side of the drive engine (3) there is a flexible suspension bracket (8, 9) and connected to them there is a suspension bar (20) for each, which are arranged inclined towards the center of gravity of the transmission unit (2) and also towards the sidewalls of the body.

4 Claims, 3 Drawing Sheets

U.S. PATENT DOCUMENTS

| | | | |
|---|---|---|---|
| 3,387,682 A | * | 6/1968 | Jaskowiak ................. 180/291 |
| 3,768,829 A | * | 10/1973 | Colovas et al. ....... 280/124.179 |
| 5,273,130 A | | 12/1993 | Nemeth |
| 6,193,007 B1 | | 2/2001 | Lie |

FOREIGN PATENT DOCUMENTS

| | | |
|---|---|---|
| WO | WO 95/09094 A | 4/1995 |

* cited by examiner

DRIVE UNIT SUSPENSION STRUCTURE, MAINLY FOR REAR ENGINE BUS

CROSS REFERENCE TO RELATED APPLICATION

This application is the National Stage filing under 35 U.S.C. 371 of International Application No. PCT/HU03/00047, filed Jun. 19, 2003.

The invention relates to a transmission suspension structure for rear engine vehicles, mainly buses, where the drive engine and the gearbox are built uniaxially to form a transmission, the common axle of which is roughly parallel with the vertical centerline of the bus.

BACKGROUND OF THE INVENTION

In prior art, it is a well-known approach when buses have a transmission unit arranged on a frame, and together with this said frame the engine/gearbox unit can be fitted and removed without having to take off certain auxiliary equipment, which reduces the downtime of the bus in repair or maintenance, and in case a replacement transmission is used, this downtime is reduced to an extremely short period. In one of these solutions already well-established in practice, the frame carries an engine/transmission unit located crosswise, and on one side it is suspended by two long vertical bars from a frame structure member located in the vicinity of the rear bus wall. At both ends, the vertical bars are linked to the frame, i.e. to the skeleton by adjoining members including flexible rubber disks. On the opposite side, the frame adjoins the bus skeleton with flexible joints, at a height close to the frame. This approach is described in patent specification HU-212.315. It is a precondition of application that above the whole frame there should be a skeleton structure of a loading capacity providing appropriate strength for adjoining the vertical suspension bars.

The objective of our invention was to find a solution which could be used for rear engine buses even if there was no load bearing skeleton structure near the rear wall, because of the body being made of fiber reinforced plastic, where it is a basic design requirement to make sure that the force is transferred over large surfaces and that its direction is in harmony with the load bearing characteristics of the structure.

SUMMARY OF THE INVENTION

Our objective was achieved on the one hand by suspending and supporting the gearbox side joint of the transmission unit by the body's very strong load bearing central part located close to the centerline when facing the front of the vehicle. On the other, the suspension of the support in the vicinity of the engine is provided by two long suspension bars, and the load is suspended well above the engine compartment to a body node suitable for absorbing a multidirectional load close to the sidewalls of the vehicle.

Our invention relates to a transmission suspension structure for a rear engine vehicle, mainly buses, where the drive engine and the gearbox are built uniaxially to form a rigid transmission unit, which has suspension brackets in front of and behind the center of gravity of the unit, in respect of the geometric axis of rotation of its main axis, the suspension bracket(s) behind the center of gravity is (are) adjoined to the gearbox, a further two suspension brackets are adjoined to the lower ends of the two suspension bars holding the transmission, and at the upper ends of the said suspension bars there are flexible adjoining members for linkage to the body of the bus in the vicinity of its right hand side and left hand side walls, there is a flexible suspension bracket on each of the two sides of the drive engine with a suspension bar connected to each, and the said suspension bars are arranged in a way that they are inclined to the center of gravity of the transmission unit, and to the sidewalls of the body.

In a preferential embodiment of our invention, the suspension bars include an angle of approx. 15 degrees with the vertical, and—projected to the cross sectional vertical plane of the body—they include an angle of approx. 30 degrees with the vertical.

In a further preferential embodiment of our invention, at the upper and/or lower end of the suspension bar, the flexible adjoining member is designed as a rubber joint, and it has a through-pin normal to the axis of the suspension bar with a fixing member on both sides of the rubber joint.

It is a great advantage of the engine suspension embodying our invention that the installed flexible units/rubber joints are pre-tensioned in all operating conditions of the engine, e.g. also when, the engine is not running, and the direction of forces transferred by them is determined, consequently the direction and rate of forces imposed on the body nodes can be accurately planned. This condition carries great importance in the case of a body made of glass fiber reinforced plastic resin, for which an appropriate solution was sought, because the suspension force could be taken to a node generated at the intersection of the three thick load bearing walls of the body, at the upper adjoining point of the slanted suspension bar. The node consists of the following three walls: engine compartment lid, side wall, engine compartment front wall. They are secured to one another by bonding and partly also by a brace.

BRIEF DESCRIPTION OF THE DRAWING

Our invention shall be described in details by way of an implementation example, where the transmission is fitted into a rear engine bus body made of glass fiber reinforced synthetic resin, and the transmission suspension is depicted by way of figures, where.

DETAILED DESCRIPTION OF THE INVENTION

Figure 1:
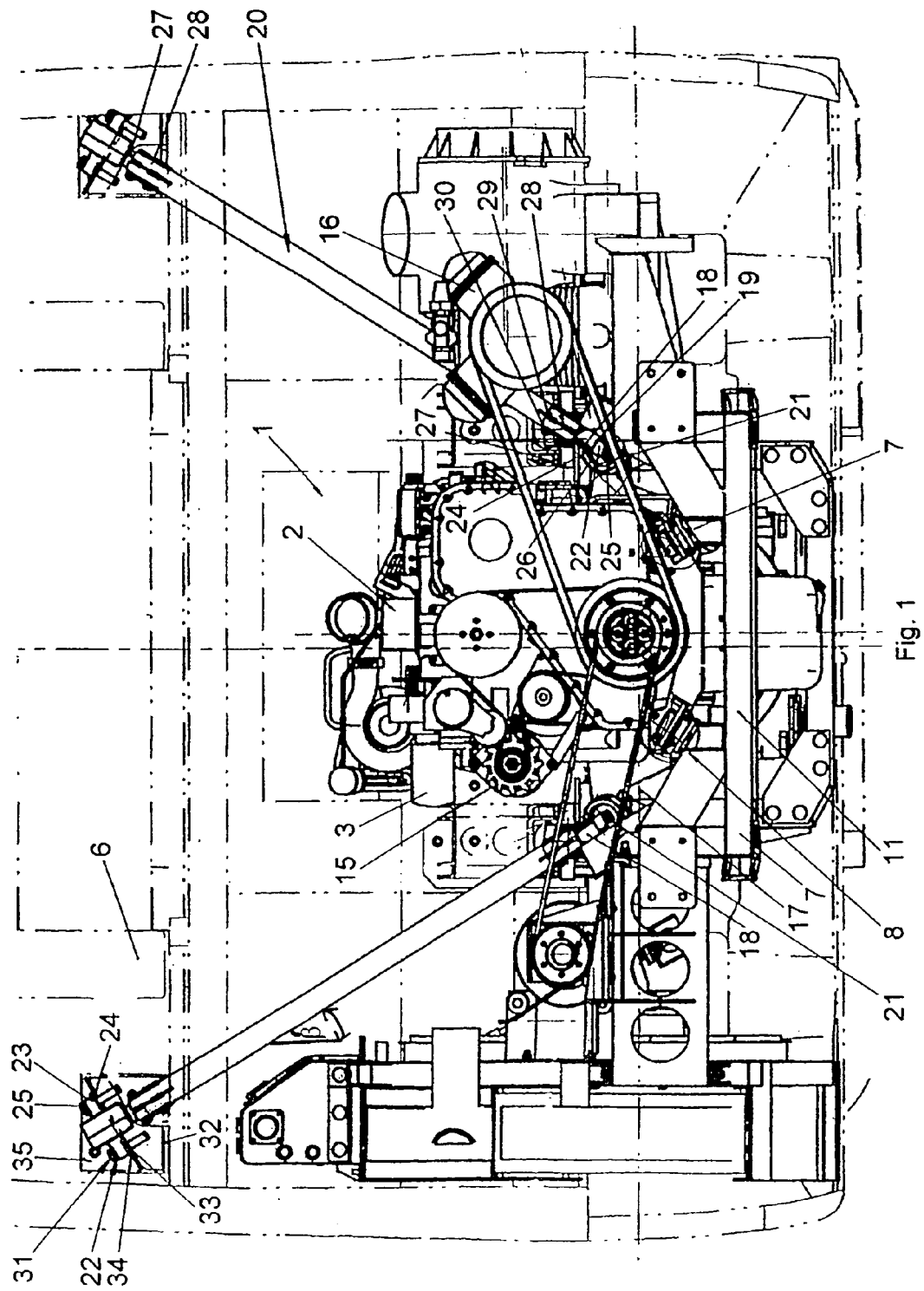
FIG. 1 shows the transmission and its suspension as viewed from the front (that is with respect to the engine)
Figure 2:
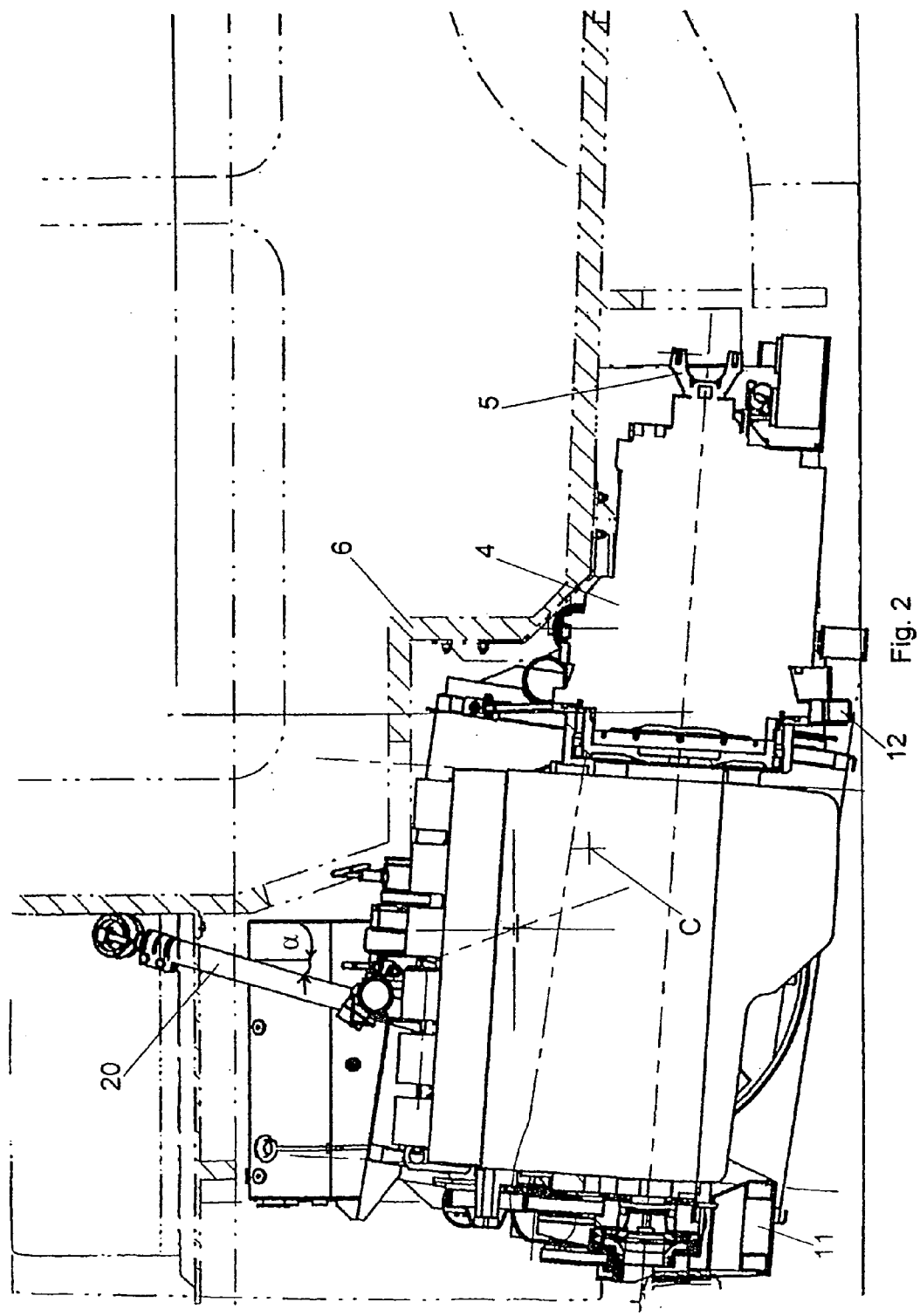
FIG. 2 shows a side view.
Figure 3:
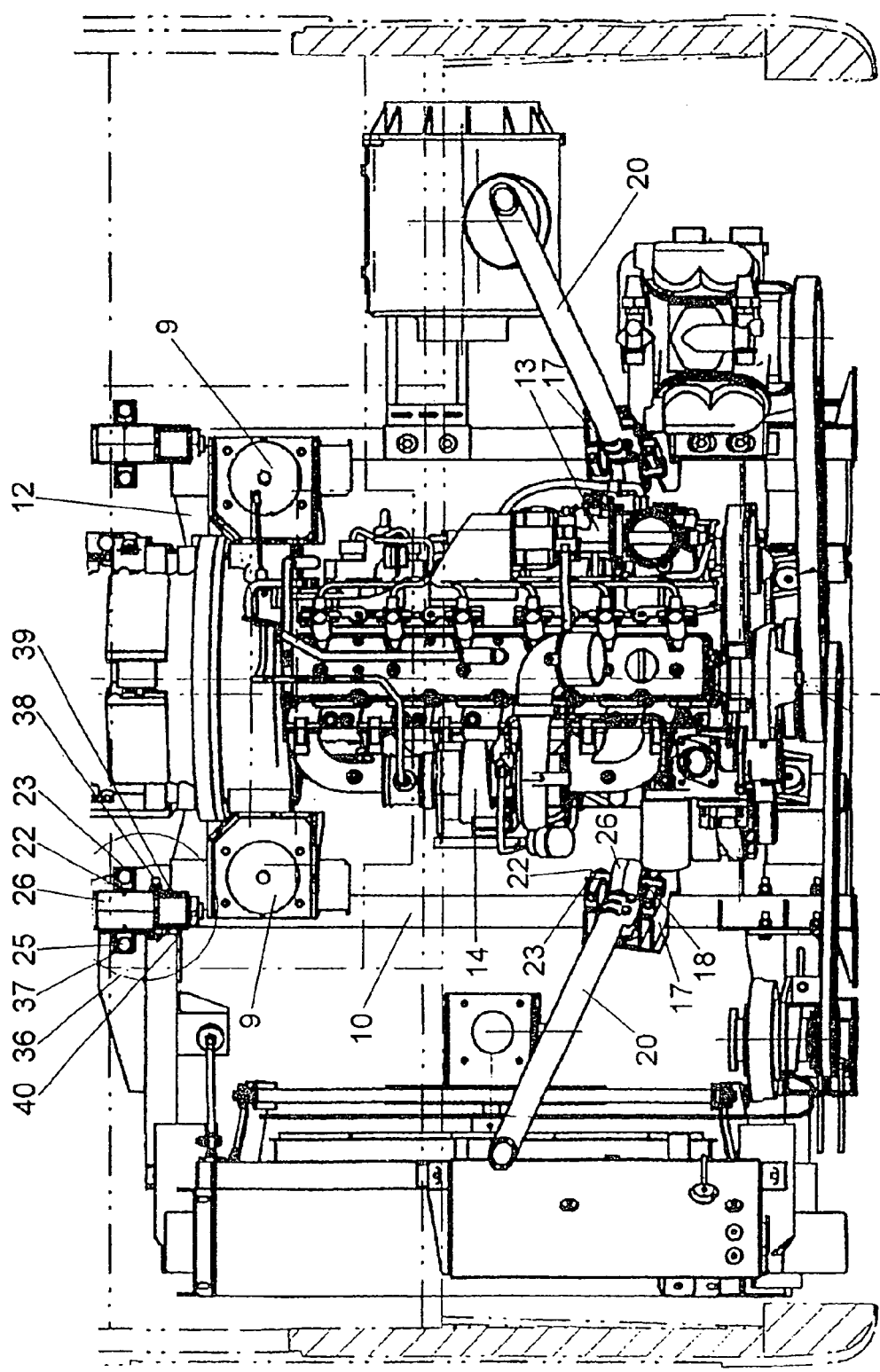
FIG. 3 shows a top view.

In our implementation example, the suspension equipment 1 of the transmission is shown together with the transmission 2, where the transmission 2 has an internal combustion piston engine 3 and screwed to it is the gearbox 4, with drive axle 5. The transmission 2 is installed into the body 6 of the rear-engine bus, which said body is made of glass fiber reinforced hardening synthetic resin. The transmission 2 is embedded in the transmission support frame 7, using two flexible front engine support brackets 8 and two flexible rear engine support brackets 9 in a way and finish well-known in prior art. The front engine support brackets 8 are inclined. When viewed from the top, the transmission support frame 7 has an oblong shape with a beam 10 on each of the right and left hand sides of the vertical engine 3. These said beams 10 are connected below the engine 3 by the transversal support 11 and in the back below the gearbox 4 by the transversal support 12. On the engine 3 and also on the transmission support frame 7, there are auxiliary equipment like the fuel injection pump 13, the turbocharger 14, the generator 15, the air compressor 16, etc.

On the beam 10 of the transmission support 7, close to the section of the engine support front members 8, support brackets are welded with bearing surfaces 19 on its nose 18. to support the bearing surfaces 24 of the pin 22 of the lower rubber joint 21 of the suspension bar 20. At both ends 23 of the pin 22, the bearing surfaces 24 are joined by the bolts 25 to the support bracket 17. The threaded stem 27 of the annular head 26 of the rubber joint 21 is screwed into the threaded end 28 of the suspension bar 20, which said threaded end is designed with the slot 29, and it is secured against turning by the clamping bolts 30. The threaded joint enables the adjustment of the length of the suspension bar 20, as well as the adjustment with regard to each other of the positions of the pins 22 of the rubber joints 21 screwed into the two threaded ends 28 of the suspension bar 20. Into both threaded ends 28 of the suspension bar 20, the same rubber joint 21 is screwed, with the upper end being screwed to the support bracket 31 built into the body 6. The suspension bar 20—projected to the cross section plane of the body—includes an angle $\alpha$ of approx. 30 degrees with the vertical. Normal to this is the bearing surface 34 of the nose 33 of the support bracket 31, and to this bearing surface the bearing surfaces 24 at the ends 23 of the pin 22 of the rubber joint 21 are screwed using the bolts 25. The support bracket 31 is an L-shaped steel plate, with one leg 32 screwed to the engine compartment lid, and with the other leg 35 screwed to the rear wall of the passenger compartment. With regard to the support brackets 31, the positions of the support brackets 17 are selected in a way that projected to the floor plane (horizontal plane) of the body, each suspension bar 20 includes an angle $\beta$ of approximately 15 degrees with the cross section plane of the body.

The transmission unit 2 and the engine support frame 7, respectively, are clamped in the vicinity of the rear transversal support 12—through the support brackets 36 welded to the beams 10—to the engine compartment front wall and floor of the body, because L-shaped support brackets are screwed to them. Fixed by the bolts 25, the bearing surface 24 at the end 23 of the pin 22 of each rubber joint 21 is held by the horizontal support surface 37 of the support bracket 36. The rubber joint 21 has a pin 38, which is embedded in the bushing 39 of the support bracket 36. At the end of the pin 38, the axial clearance is limited by the washer 40 and an axle nut.

As demonstrated above, the transmission suspension unit 1 is suspended in the body in a very favorable way from the aspect of vibration load, because the transmission unit 2 is flexibly supported in the transmission frame 7, and the latter is suspended in the body by the rubber joints 21.

The invention claimed is:

1. A suspension structure for a transmission of a rear engine vehicle, mainly buses, where a drive engine and a gearbox are built uniaxially to form a rigid transmission unit, which has suspension brackets in front of and behind a center of gravity of the unit, with respect to a geometric axis of rotation of a main axis of the transmission unit, the suspension bracket(s) behind the center of gravity is (are) joined to the gearbox, a different two of the suspension brackets are joined to respective lower ends of two suspension bars holding the transmission unit, and at upper ends of the said suspension bars there are flexible joining members for linkage to the body of the rear engine vehicle in the vicinity of its right hand side and left hand side walls, and wherein on each side of the drive engine in front of the center of gravity there is a flexible one of said two different suspension brackets that is connected to a lower end of a respective suspension bar, which suspension bars are arranged inclined towards the center of gravity of the transmission unit and also towards the sidewalls of the body.

2. The mechanism according to claim 1, wherein a longitudinal axis of each of the suspension bars—projected to a centerline of the body—includes an angle of approximately 15 degrees with the vertical.

3. The mechanism according to claim 1, wherein a longitudinal axis of each of the suspension bars—projected to the cross sectional vertical plane of the body—includes an angle of approximately 30 degrees with the vertical.

4. The mechanism according to claim 1, wherein at the upper and/or lower end of each suspension bar, the flexible jointing member is designed as a rubber joint, which has a through pin normal to the a longitudinal axis of the suspension bar with a fixing member on both sides of the rubber joint.

* * * * *